(12) United States Patent
Kodera

(10) Patent No.: US 7,527,140 B2
(45) Date of Patent: May 5, 2009

(54) PARTS FEEDER AND TERMINAL PRESS-CONNECTION DEVICE

(75) Inventor: Hiroshi Kodera, Gifu (JP)

(73) Assignee: Kodera Electronics Co., Ltd., Gifu (JP)

( * ) Notice: Subject to any disclaimer, the term of this patent is extended or adjusted under 35 U.S.C. 154(b) by 7 days.

(21) Appl. No.: 10/552,499

(22) PCT Filed: Mar. 30, 2004

(86) PCT No.: PCT/JP2004/004574

§ 371 (c)(1),
(2), (4) Date: Oct. 7, 2005

(87) PCT Pub. No.: WO2004/089791

PCT Pub. Date: Oct. 21, 2004

(65) Prior Publication Data

US 2006/0201781 A1    Sep. 14, 2006

(30) Foreign Application Priority Data

Apr. 7, 2003    (JP) .............................. 2003-102530

(51) Int. Cl.
*B65G 47/14*    (2006.01)

(52) U.S. Cl. ................ 198/396; 198/392; 198/391; 198/444; 198/753; 198/751

(58) Field of Classification Search ............... 198/391, 198/392, 396

See application file for complete search history.

(56) References Cited

U.S. PATENT DOCUMENTS 5,609,463 A * 3/1997 Kobayashi et al. .......... 414/675
5,826,697 A * 10/1998 Mochizuki et al. .......... 198/392

* cited by examiner

*Primary Examiner*—Gene Crawford
*Assistant Examiner*—Kavel P Singh
(74) *Attorney, Agent, or Firm*—Apex Juris PLLC.; Tracy M. Heims (57) ABSTRACT

Plural receiving recesses are radially formed at the periphery of the disc-like rotating body. The rotating body is rotatably installed at the base, and the cylindrical cover is provided at outside of the periphery of the rotating body. From the receiving region of the receiving recess for receiving the waterproof seal to downstream side of the rotational direction of the rotating body, the first brush and the second brush are attached with the cover and at the further downstream side, the detection device and the take-out device are mounted on the base in order.

3 Claims, 7 Drawing Sheets

PARTS FEEDER AND TERMINAL PRESS-CONNECTION DEVICE

BACKGROUND OF THE INVENTION

1. Field of the Invention

This invention relates to a parts feeder and a terminal press-connection device, more particularly to a parts feeder and a terminal press-connection device which facilitates to feed a waterproof seal with an attaching directionality in a predetermined direction.

2. Description of the Related Arts

Conventionally, a terminal press-connection device is known to process terminal parts such as a transmission cable for a vehicle. This traditional press-connection device, in a reduced time, is to provide accurate performance of sectioning/cutting of the terminal cable of the terminal parts, stripping (removing covering material), twisting, welding, and press-connection of connection terminal. Also, a waterproof seal is used for the purpose of waterproofing the terminal cable and is inserted in the terminal cable of the terminal parts by the terminal press-connection device.

This waterproof seal, generally, is a tube-like shape in entirety. The axial front end side of thereof is tapered with a smaller diameter tube while the axial rear end side (from center) has a larger diameter in an accordion shape. An outer circumference of the front end side tube has a fixed piece, which is provided at the rear end side, is rotationally fixed, thereby fixing the waterproof seal on the covering material surface of the terminal cable with watertight effect and preventing the waterproof seal from detaching from the connection terminal. Also, the larger diameter accordion tube has its internal continuous circumferential surface fitting with an insertion bore formed on a connector to be connected with the connection terminal, thereby preventing the water coming from the connection terminal installation side relative to the connector.

When installing the waterproof seal in the terminal press-connection apparatus, there are a rectilinear feeder with a moving track for the waterproof seal, moving the waterproof seal to the installation/insertion position, and the parts feeder feeding the waterproof seal and the waterproof seal to the rectilinear feeder. These are used to automatically feed the waterproof seal. Then, as the rectilinear feeder appropriately feed the waterproof seal, there is "oscillating parts feeder" filed by this applicant (Provisional Japan patent Publication No. 10-310216). This has oscillating functions and moves the waterproof seal as applying oscillation to the moving track at a predetermined cycle. Furthermore, the range of the oscillation can be increased periodically in order to prevent the waterproof seal from being stuck on the way and to eliminate the possibility of stopping the waterproof seal feeding operation.

Also, generally, the parts feeder may have a round ball shaped ball type parts feeder having the oscillation mechanism and a spiral alignment step at the inner surface side or has a rotation mechanism and a blade piece shape bottomed tube rotation drum parts feeder having the rotation mechanism and a scraping blade at the inner circumferential surface ("cable terminal processor", Japanese Patent Publication No. 2909689). The former device elevates the waterproof seal received by oscillation of the oscillation mechanism along the alignment step and feeds the waterproof seal to the moving track of the rectilinear feeder in order. Regarding the latter device, the waterproof seal received inside the rotation drive of the rotation drum is elevated by the scraping blade, thereby allowing to drop naturally on one end portion of the rectilinear feeder.

However, the ball type parts feeder, as the diameter becomes larger, needs to extend the length of the moving track of the rectilinear feeder in order to avoid interference with other devices, and therefore the terminal crimping apparatus needs to be larger. Also, as the length of the moving track longer, possibility of the waterproof seal getting stuck on the way becomes more. On the other hand, regarding the rotation drum parts feeder, the amount of waterproof seal to be elevated varies depending upon the amount of waterproof seal received inside, and therefore the waterproof seal is not necessarily, stably fed relative to the rectilinear feeder. In addition, when add the waterproof seal, the rotation drum needs to be detached, which requires more time and is troublesome.

Figure 7:
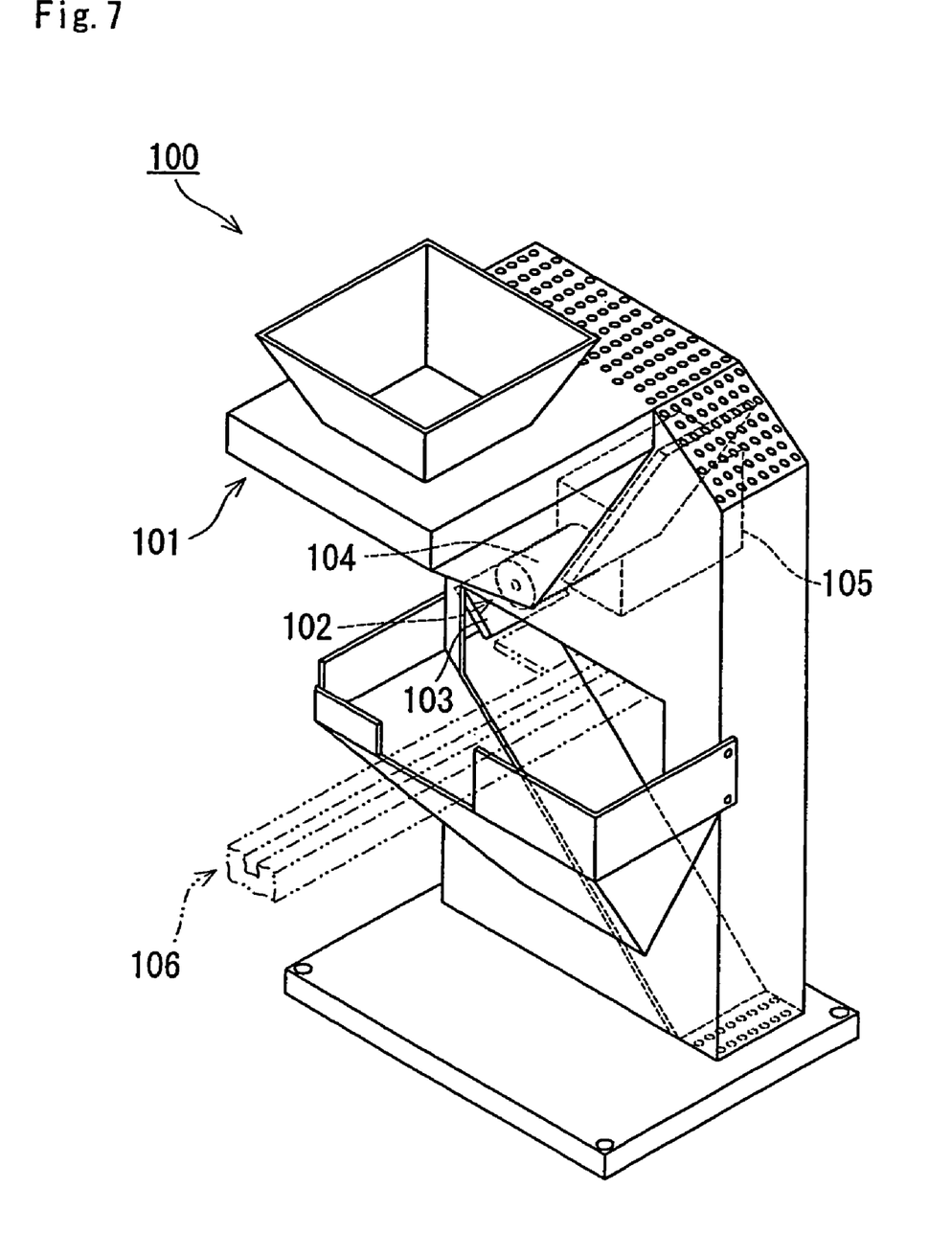
FIG. 7 is a perspective view of the structure of the conventional parts feeder.

Then, the inventor of this invention invented the parts feeder as shown in FIG. 7. This parts feeder 100 comprises a hopper 101 reserving the waterproof seal at the upper portion and a guiding plate 103 leading the waterproof seal adjacent to an exit 102. Also, the parts feeder 100 has a brush 104 cooperating with the guiding plate 103 to receive the waterproof seal from the exit, and the brush 104 is rotated by the drive control section 105. As rotating the brush 104, the predetermined amount of the waterproof seal is exited from the exit 102 and is guided to the guiding plate 103 to be fed to the rectilinear feeder 106. Then, the waterproof seal, which is supplied to the rectilinear feeder 106, while being in the upright position, is fed on the rectilinear feeder 106.

This applicant recognizes Japanese Patent Application No. 2001-399697 which describes the above-mentioned conventional technologies.

However, the above-described parts feeder, in order to move the waterproof seals to the installation position of the terminal press-connection device, still requires the use of the rectilinear feeder, and the terminal press-connection device of this type comprises the rectilinear feeder and the parts feeder, which is a large in its size and has a higher cost.

This rectilinear feeder is to supply the waterproof seal while being in the upright position, and the parts feeder allows the waterproof seal while being in the upright position to be supplied to the moving track by slightly adjusting the angle of the guiding plate installation, the distance between the guiding plate and the brush, and what not, thereby making the waterproof seal in the upright position, which reduces the time required for the adjustment. Another adjustment is necessary when changing the shape or size of the waterproof seal, which lacks flexibility.

Also, for the waterproof seal with different shapes between the front and rear ends, even if the accordion tube is located in the lower side to upright the waterproof seal, the waterproof seal rarely falls down, which allows the feeding by the rectilinear feeder. However, recently, as smaller size connection terminal becomes on demand, the waterproof seal of the connection terminal needs to become smaller with smaller diameter. If the shape of the waterproof seal does not vary in the axial direction, when the waterproof seal is in the upright position, it becomes unstable and easy to fall down. Therefore, as supplying by the rectilinear feeder, the problems such as that the waterproof seal falls down while moving on the track of the rectilinear feeder or the waterproof seal cannot be transferred from the rectilinear feeder to the next process. Therefore, the parts feeder that can supply/feed smaller parts feeder with can be fed.

This invention was made in consideration of the above circumstances and is to provide the parts feeder, regardless of the types of the waterproof seal, has a simple structure and is able to direct the waterproof seal in the predetermined direction to transfer to the next process.

SUMMARY OF THE INVENTION

The parts feeder of this invention comprises a receiving portion with directionality for receiving a waterproof seal which is a disc-like rotating body with inclination in a predetermined angle, a receiving recess radially provided at the periphery of the receiving portion to be released in an outside of an axial right angle of the receiving portion and an upper surface, the receiving recesses receive the waterproof seal with top thereof directing a center of the receiving portion, a cover for restricting a movement of the receiving portion of the waterproof seal received by the receiving recess toward the outside of the axial right angle and surrounding the periphery of the receiving portion, a take-out means with a take-out exit opening at an inner circumferential surface of the cover to taking out the waterproof seal received in the receiving recess in the axial right direction, a moving means for moving the receiving recess from a receiving region where the waterproof seal is received by the receiving recess to the take-out means by way of a rotational motion of the receiving portion, and an exclusion means for eliminating a chance of moving the waterproof seal which is not received by the receiving recess and is among the waterproof seals from the receiving region to the take-out means.

The receiving recess is not limited to a particular structure but is satisfactory if the receiving recess can receive the waterproof seal only in the predetermined direction regardless of the shape or depth. The take-out means is not limited to a particular structure but can be such as a means to fetch by suction due to negative pressure, to fetch by abutting such as a bar against thereof to pushing the same, to fetch by grasping, to fetch by skewering, and to fetch by reversing the top and bottom of the receiving recess and dropping with its weight. Also, "exclusion means" is not limited to any particular structure but may be "providing an abutment means such as a plate or a brush at a position higher than waterproof seal received by the receiving recess so as to abut against the waterproof seal not received to remove that waterproof seal", "providing the receiving portion formed on the receiving recess with inclination in more than the predetermined angle so as to effectuate the gravity to remove the waterproof seal not received by the receiving recess", "rotating the receiving portion formed with the receiving recess to effectuate the centrifugal force to remove the waterproof seal not received by the receiving recess". Also, regarding a material for abutting against the waterproof seal, it is preferable that the material is relatively soft so as not to damage the waterproof seal as abutting.

According to the parts feeder of this invention, the waterproof seal with the directionality is received at the receiving portion, is directed in the predetermined direction by receiving thereof in the receiving recesses formed at the receiving portion, and is taken out by the take-out means. That is, the waterproof seals will not received in the direction other than the predetermined direction in the receiving recess, thereby directing the waterproof seals in the predetermined direction simply by taking out the waterproof seals received in the receiving recess. As such, the waterproof seal can be directed in the predetermined direction simply forming the receiving recess receiving the waterproof seals only in the predetermined direction in the receiving portion, which simplifies the structure of the parts feeder.

When changing the types of waterproof seals, the receiving portion simply needs to have the receiving portion with the receiving recesses appropriate for the shape of waterproof seal, which facilitates the operation and is applicable to many types of waterproof seals, thereby providing the parts feeder with an excellent flexibility.

Furthermore, even if plural types of waterproof seals are to be received in the receiving portion, by adjusting the receiving recess to the smallest waterproof seal, the smallest waterproof seal may be taken out from various waterproof seals. Accordingly, for example, the receiving recesses can be in combination with different parts feeder, which broadens the applicability to various types of the waterproof seals at the same time.

Also, according to the parts feeder of this invention, the moving means moves the receiving recess from the receiving region to the take-out means. That is, because the receiving region and the take-out means may be installed in separate positions, sufficient space for the waterproof seals to be in the receiving portion may be secured at the receiving region, and there is no need to stop the device when supplying the waterproof seals, thereby facilitating the supply of the waterproof seal.

Also, the moving means secures the distance between the receiving region and the take-out means so as to position other devices therebetween, thereby for example increasing the degree of freedom with respect to arrangements in the entire terminal press-connection device and downsizing the device with the parts feeder.

Furthermore, according to the parts feeder according to of this invention, the exclusion means excludes the waterproof seal not received in the receiving recess, and when the take-out means removes the waterproof seal not received in the receiving recess as it lay over the waterproof seal received in the receiving recess, the take-out means is able to remove an obstacle and prevent from mistakenly removing the waterproof seal not received in the receiving recess.

Also, according to the parts feeder of this invention, the receiving portion is the disc-like rotating body and the moving means operates as rotating the rotating body. Therefore, the receiving portion does not need to make a reciprocating motion, which simplifies the structure of the moving means. Also, comparing to the belt-like receiving portion, the number of parts and the cost decreases. Also, by forming the receiving recess around the periphery of the rotating body, the waterproof seal not received in the receiving recess moves toward the peripheral portion of the rotating body formed on the receiving recess by centrifugal force, thereby facilitating the receipt of the waterproof seal in a space of the receiving recess. The parts feeder of this invention is comprised of the receiving detection means having the first sensor standing relative to the receiving recess to detect the positioning bore and the second sensor to detect the slit formed in the receiving recess and the controlling means determining that the waterproof seal is received by the receiving portion, based on the detection result from the receiving detection means, when the first sensor detects the positioning bore and the second sensor does not detect the slit in order to control the take-out means.

Here, the detection means is not limited to a particular structure and may be a structure which "has an emission portion and light-intercepting portion where the waterproof seal within the receiving recess shuts the light from the emission portion off or reflect the light from the emission portion" or "detects the waterproof within the receiving recess by providing a contact switch".

Also, the control means is not limited to the structure stated above and may be so-called a microcomputer comprising CPU, RAM, ROM, and other input and output devices. Also, the control means may cooperate with other means comprising the parts feeder.

In the parts feeder according to this invention, based on the detection result of the detection means, the control means controls the take-out means. More specifically, the control means confirms that the waterproof seal is received in the receiving recess and if the waterproof seal is in the receiving recess, the take-out means is activated to remove the waterproof seal. As such, while the waterproof seal is not being in the receiving recess, the take-out means never operates eliminating an unnecessary action of the take-out means. Also, the waterproof is removed after confirming that the waterproof seal is received, thereby providing more accurate take-out of the waterproof seal.

According to the parts feeder of this invention the moving means has the stepping motor; and the controlling means, when taking out the waterproof seal by the taking out means, controls the moving means to stop the movement of the receiving portion.

According to the parts feeder of this invention, when taking out the waterproof seal, the rotational movement of the receiving portion may be stopped and the take out means is capable of taking out the waterproof seal almost straight in the axial direction.

The terminal press-connection device according to this invention is comprised of the above-described parts feeder, wherein the press-connection is performed by inserting the waterproof seal transferred from the parts feeder in and attaching the connecting terminal around an end portion of an electric transmission cable.

According to the terminal press-connection device according to this invention, the terminal press-connection device comprises the above-described parts feeder so that the productivity of the terminal press-connection device is improved and the cost of manufacturing the terminal press-connection device is lowered.

As such, according to this invention, the receiving recess is formed so that the waterproof seal is received only in the predetermined direction in the receiving portion and the waterproof seal received in the receiving portion may be removed. Therefore, this invention does not depends upon the type of waterproof seal and provides a simple structure for directing the waterproof seal in the predetermined direction to be transferred to the next process.

BRIEF DESCRIPTION OF THE DRAWINGS

The above and other objects of the present invention will become readily apparent by reference to the following detailed description when considered in conjunction with the accompanying drawings wherein:

FIG. 2(1) is a plan view of the structure of the parts feeder 9;

FIG. 2(2) is a side view of the structure of the parts feeder 9;

PREFERRED EMBODIMENT OF THE INVENTION

Figure 1:
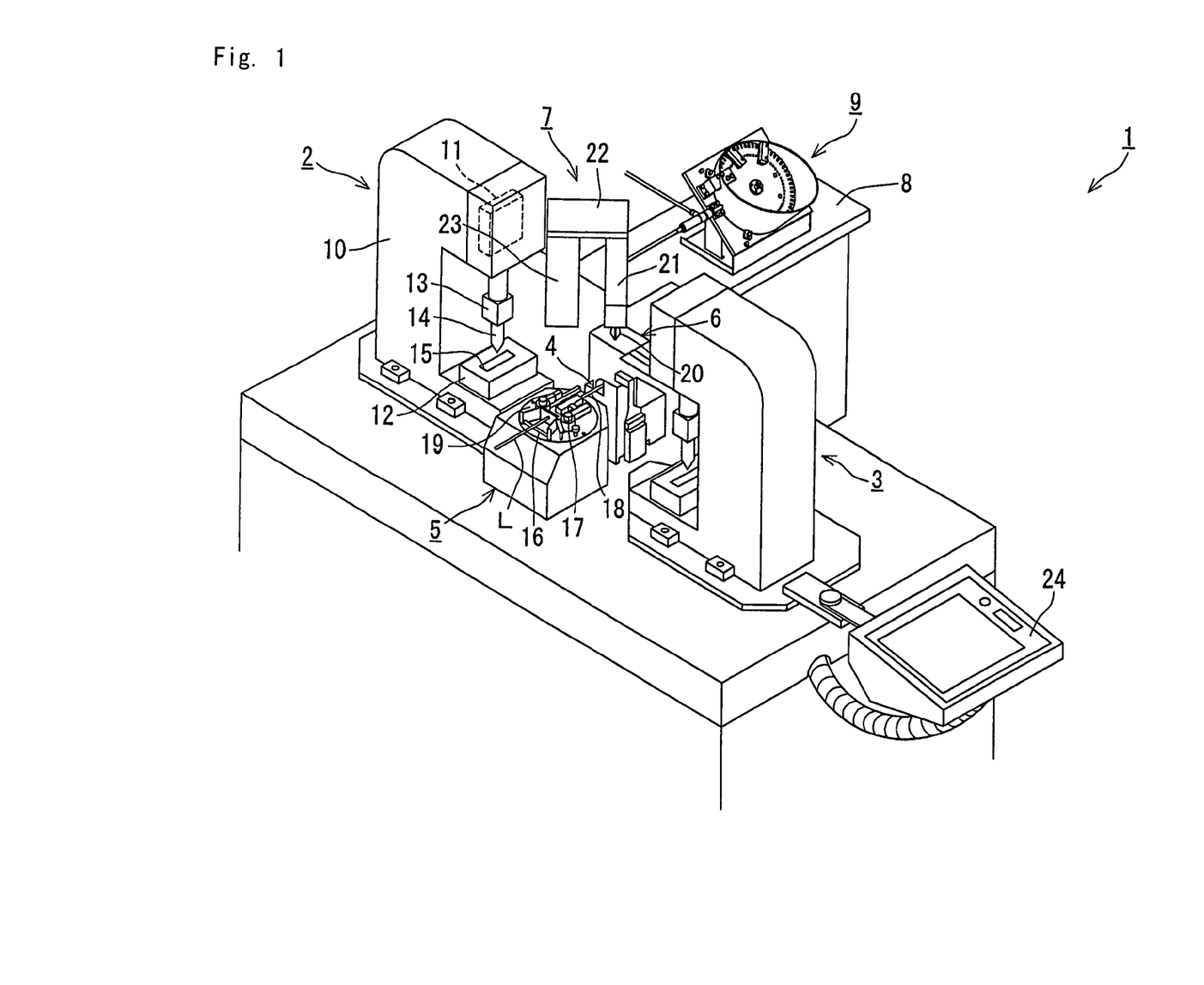
FIG. 1 is a perspective view of the entire structure of the terminal press-connection device with the parts feeder in the first embodiment of this invention.
Figure 2:
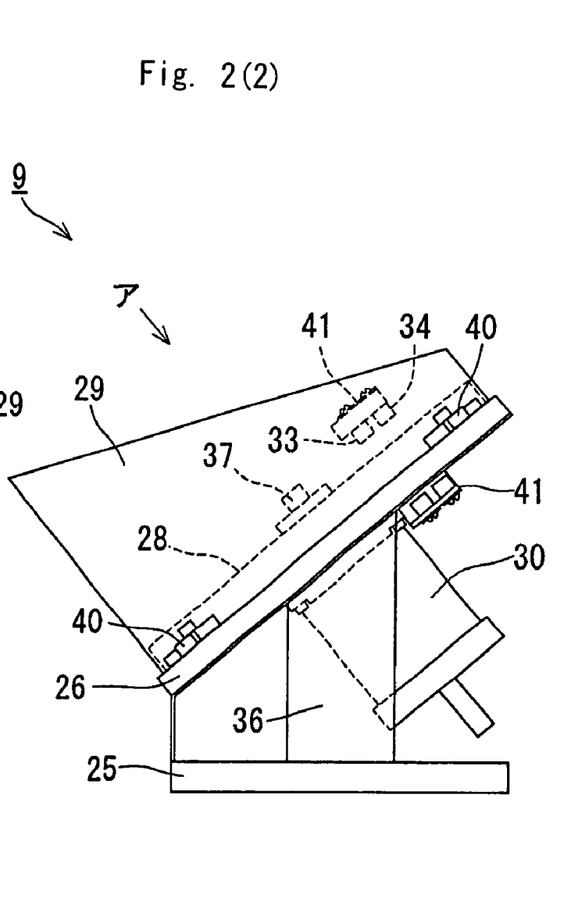

The terminal press-connection device according to one embodiment of this invention will be explained below with reference to the drawings. FIG. 1 is a perspective view of the entire structure of the terminal press-connection device. The terminal press-connection device 1 feeds the electric wire L, insert the waterproof seal, removing the covering material, presses and flattens the connecting terminal, and sections/cuts the electric wore, which continuously generates the electric wire L with the certain length which has the waterproof seal installed in one end thereof and the connecting terminal with both ends thereof.

As shown in FIG. 1, the terminal press-connection device 1 comprises a first press-connecting body 2 for press-connecting the connecting terminal at a front end side of the electric wire L, a second press-connecting body 3 for press-connecting the connecting terminal at a rear end side of the electric wire L, a sectioning mechanism 4 sectioning the electric wire L as well as removing the covering material of the end of the electric wire L, an electric wire transferring mechanism 5 for transferring the front end side of the electric wire L to the first press-connecting body 2, a chuck mechanism 6 retaining the electric wire L after sectioning and transferring the rear end side of the electric wire L to the second press-connecting body 3, an insertion mechanism 7 for inserting the waterproof seal in the front side of the electric wire L, and the parts feeder 9 for supplying the waterproof seal to the insertion mechanism 7.

The first press-connecting body 2 and the second press connecting body 3 have identical basic structure, and therefore the explanation of the first press-connecting body 2 is omitted. the first press-connecting body 2 comprises a support member 10 vertically standing in the longitudinal direction, a plate 11 positioned at an upper side of the support 10 making vertical movement due to the driving mechanism (not shown in the figures), and a base 12 positioned at a lower side of the support member 10. Also, the support member 10 is made of metal and has C-shape in its cross-section.

The plate 11 has a pressing member 14 via an adjustment mechanism (not shown in the figures) and a pressure sensor 13. The pressing member 14 penetrates the plate 11 from the lower ends and is designed to adjust the length of penetration toward the lower side by the adjustment mechanism. That is, the pressing member 14 makes a vertical movement together with the plate 11.

The base 12 has an almost entirely flat surface and a concave anvil 15 formed on the base 12 corresponding with the pressing material 14. Therefore, as the driving mechanism operates while supplying the connecting terminal to the anvil 15 of the base 12, the pressing material 14 moves downward along with the plate 11 and the end of the pressing material 14 and the anvil 15 formed on the base 12 engage, thereby pressing and flattening the connecting terminal. Also, the pressure applied on the pressing material 14, upon pressing and flattening the connecting terminal between the pressing material 14 and the anvil 15, is detected by the pressure sensor 13.

The first press-connecting body 2 predetermines the tolerance standard range of the connection strength and the connection resistance between the electric wire L and the connecting terminal, analyzes the changes in the pressing force detected by the pressure sensor 13, and determines whether the connection strength and connection resistance between the electric wire L and the connecting terminal are within the allowable range. Furthermore, if the pressure sensor 13 shows press-connecting failure as the result of the analysis, i.e., the pressure detected exceeds the tolerance range, it is excluded as a defect.

The first press-connecting body 2 has a terminal transfer means (not shown in the figures) to supply the connecting terminal to the anvil 15 of the base 12 in order. The terminal transfer means is to transfer the serially connected connecting terminal along the guiding member and cooperates with the operation of the pressuring member 14. That is, after pressing and flattening the connecting terminal, the terminal transfer means transfers the serially connected connecting terminal corresponding to the movement of the pressing material 14 in an initial position.

The sectioning mechanism 4 is to section/cut the electric wire L and remove the covering material of the end of the electric wire L, which comprises two blades (upper and lower blades) positioned at an upper side and a lower side and the moving means (not shown in the figures) to make a vertical movement relative to the upper and lower blades. That is, the moving means operates to abut the upper blade against the lower blade to section the electric wire L while the electric wire L is being inserted between the upper and the lower blades. Also, in order for the end of the electric wire L to project to certain length, while the electric wire L is being inserted between the upper and lower blades, the moving means moves to adjust the distance between the upper and lower blades corresponding to the size of the electric wire core. Then, the electric wire transferring mechanism 5 or the chuck mechanism 6 pulls the electric wire L, which removes the covering material of the end of the electric wire L.

The electric wire transferring mechanism 5 is designed such that a electric wire take-in guide 16, a roller 17, and a guide pipe 18 are arranged on a disc-like plate 19. The roller 17 drives the roller driving means (not shown in the figures), which sends the electric wire L to the predetermined length as controlling the rotational direction and the number of rotation. The electric wire L installed via the electric wire take-in guide 16 is transferred into the guide pipe 18 and further guided toward front end of the guide pipe 18.

The disc plate 19 of the electric wire transfer mechanism 5 rotates within the predetermined angle by the rotating means (not shown in the figures) with such as a motor. That is, when the disc plate 19 rotates by the rotating means, the end of the guide pipe 18 moves and the end of the guide pipe 18 faces the anvil 15 of the first press-connecting body 2 as rotating the predetermined degree. Under this condition, as the roller 17 transfers the electric wire L, the end of the electric wire L is inserted into the predetermined portion of the connecting terminal positioned on the anvil 15.

The chuck mechanism 6 is provided at the rear side of the sectioning mechanism 4 and is comprised of a retention means, a moving means, and a transferring means (all not shown in the figures). The retention means is attached to the end of the transferring means and catches in to retain the electric wire L. Also, the moving means, as the retention means drawing an arc, moves the retention means and the transferring means within the predetermined range, wherein the rear end of the electric wire L is moved from the sectioning mechanism 4 side to the second press-connecting device body 3 side while the electric wire L being retained by the retention means. Also, the transferring means is to transfer the retention means to the front and rear directions thereof. The rear end side of the electric wire L is transferred to the predetermined position on the connecting terminal located on the anvil of the second press-connecting device body 3, and after pressing and flattening the connecting terminal, the electric wire L press-connected with he connecting terminal is removed from the anvil.

The insertion mechanism 7 is comprised of a supporting arm 21 which has a pair of pawl portions 20 to catch the waterproof seal and a moving mechanism (not shown in the figures) for the pawl portions 20 and supports the pawl portions 20 at an insertion process position of the waterproof seal, a top board 22 attached to the supporting arm 21, and a supporting member 23 which supports the supporting arm 21 parallel to the horizontal axial line via the top board 22. Also, the supporting arm 21 is comprised of a setting back mechanism (not shown in the figures) which rotates the waterproof seal supplied from the parts feeder 9 in 90 degrees to stand the front side of the waterproof seal up and a carry pin (not shown in the figures) picking up the waterproof seal from the setting back mechanism, wherein the waterproof seal picked up from the carry pin is rotated at every carry pin in order for the rear end side to face the electric wire transfer mechanism 5 and the pawl portions 2 receive the waterproof seal under this condition. Furthermore, the pawl portions 20 in receipt of the waterproof seal moves to the insertion process position by the moving mechanism while catching the waterproof seal.

The terminal press-connection device 1 has an operation portion 24, and the operator can control a series of performances such as sending the electric wire L in, inserting the waterproof seal, removing the covering material, press-connecting the connecting terminal, and sectioning the electric wire L. Also, various settings of the series of motion may be changed according to such as the operation content.

Figure 3:
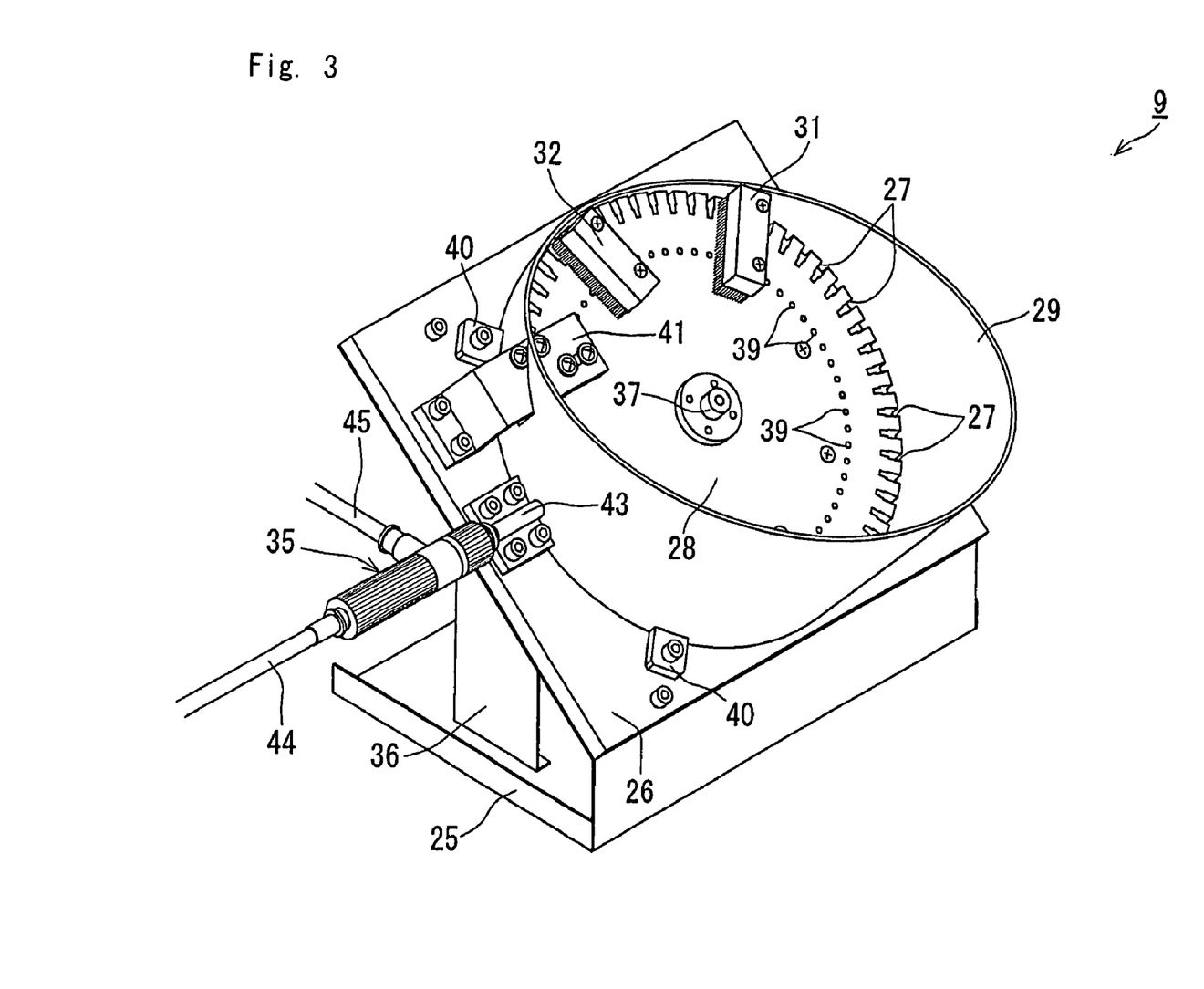
FIG. 3 is a perspective view of the structure of the parts feeder.

Next, the structure of the parts feeder 9 will concretely be explained with reference to FIGS. 2 and 3. FIG. 2(1) is a plan view of the structure of the parts feeder 9 and FIG. 2(2) is a side view of the structure of the parts feeder. FIG. 3 is a perspective view of the structure f the parts feeder 9. This parts feeder 9 sends the waterproof seal from above to the predetermined direction toward the insertion mechanism 7 in order.

As shown in FIGS. 2 and 3, the parts feeder 9 is comprised of the base portion 25 to be mounted on the installation base 8 (referring to FIG. 1) of the terminal press-connection device 1 with the upper surface thereof having the predetermined angle, a base 26 mounted on the base portion 25, a disc-like rotating body on the base 26 which has the receiving recesses 27 to receive the waterproof seal, a cylindrical cover 29 surrounding the periphery of the rotating body 28, a motor 30 rotating the rotating body 28 provided at the back side of the upper surface of the base portion 25, a first brush 31 and a second brush 32 provided on the upper surface of the rotating body 28, a first sensor 33 and a sensor 34 provided to face either other with the rotating body 28 in between, and a taking-out device 35 taking out the waterproof seal received in the receiving recesses 27 at the right side of the periphery of the rotating body 28. Also, the reference number 46 stands for the waterproof seal as (referring to FIG. 5)

The base portion 25 is formed by bending the metal plate to make an inclined surface, the upper surface thereof leaning in the predetermined angle relative to the horizontal direction. Also, the respective supporting plates 36 are provided adjacent to right and left ends of the base portion 25, thereby supporting the upper surface by the supporting plate 36. The upper surface of the base portion 25 has a rectangular plate base 26 thereon.

The motor 30 is installed around the center of a back side of the upper surface of the base portion 25, and a rotation axle 37 of the motor penetrates the upper surface of the base portion 25 and the base 26 to extend toward the upper side of the base 26. Then, the rotating body 28 is fixed to the rotation axle 37 projecting from the base 26, and the rotating body 28 rotates together with the rotation axle 37. That is, the rotating body 28 is rotatably installed relative to base 26. Also, in this example, the rotating body 28 rotates in the counterclockwise direction by the motor 30. The rotating body 28 is comparable to the receiving portion in this invention and the rotating body and the motor are comparable to the moving means in this invention.

Figure 5:
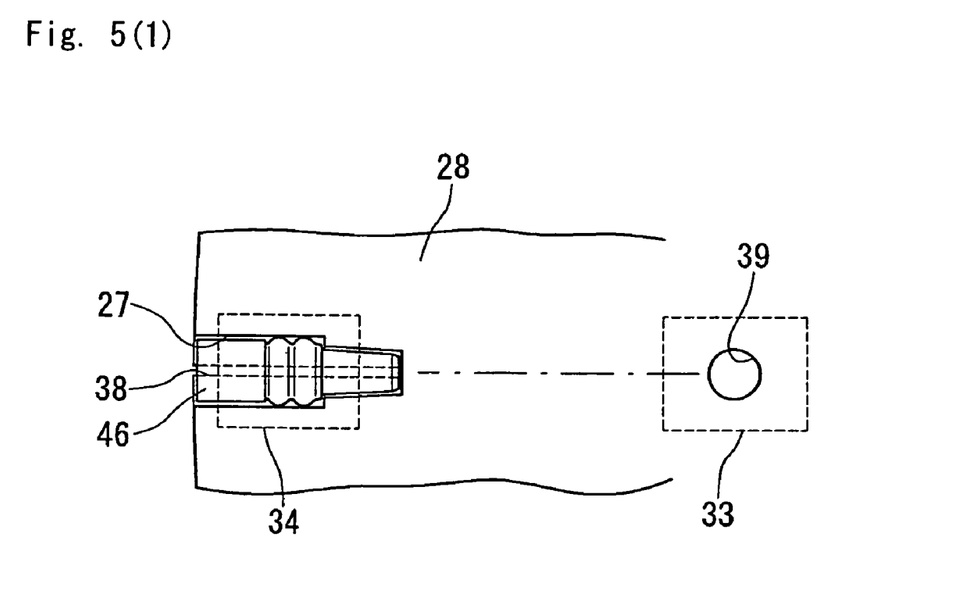
FIG. 5 is a cross section view explaining the relation between the receiving recess and a positioning bore and the detection means.

Plural receiving recesses 27 are radially formed at the upper surface of the rotating body 28 along the periphery thereof with the front end side of the waterproof seal 46 facing with the center of the rotating body 28, and the receiving recesses 27 in this example has 60 pieces. As shown in FIG. 5, the receiving recesses 27 is concave with opening at the upper surface side and the depth thereof is sufficient to approximately have the entire waterproof seals 46 within the receiving recesses 27. Also, in the plan view, the size of the receiving recess 27 is slightly larger than the outline of the waterproof seal 46 and receives the waterproof seal 46 only from the predetermined direction.

The receiving recess 27 is such that the rear end side, at the periphery of the rotating body 28, is open at the outside in the axial right angle and the movement toward outside in the axial right angle direction of the rotating body 28 of the waterproof seal 46 received in the receiving recess 27 is controlled by the inner circumferential surface of the cover 29. The receiving recess 27 has a slit 38 penetrating the rotating body 28 along the axial direction (axial right angle direction of the rotating body 28). The later described second sensor 34 performs sensing via the slit 38.

The rotating body 28 is such that a positioning bore 39 is formed and stands on a line between the rotating body 28 and the central axis at the position with the predetermined distance apart from the inner circumferential side of the receiving recess 27 so as to penetrate the rotating body 28. The number of positioning bore 39 to be decided in consideration of the receiving recesses 27. The later described first sensor performs sensing via the positioning bore 39, and together with the sensing of the second sensor 34, detects whether the waterproof seal 46 is received in the receiving recess 27.

The cover 29 is a cylindrical shape to cover the outside of the periphery of the rotating body 28. This cover 29 has installation flanges 40, extending at the outside of the radial direction at the bottom portion, provided at four positions on the circumference, and the cover 29 is installed on the base 26 via the installation flange 40. Also, the upper portion of the cover 29 leans toward a position where the operator acts relative to the horizontal direction, i.e., leaning downward at the central region toward right side of FIG. 2(2). Accordingly the opening at the upper portion of the cover 29 has a larger opening area than when the cover 29 is sectioned in the axial right angle direction. Also, there is a slight gap between the rotating body 28 and the cover 29 so that the periphery of the rotating body 28 does not abut against the inner circumference of the cover 29.

The inner circumferential surface of the cover 29 has the first brush 31 and the second brush 32, wherein the first brush 31 and the second brush 32 face have their front ends facing with the upper surface of the rotating body 28. The first brush 31 is provided at the upstream side of the rotating direction of the rotating body 28 and more precisely at the upper right side relative to the center of the rotating body 28. The second brush 32 is provided at the downstream side of the first brush 31, at slight left side from the top of the rotating body 28.

By the first brush 31 and the second brush 32 are such that when the waterproof seal 46 not received in the receiving recesses 27 formed in the rotating body 28 moves toward the downstream side of the rotational direction as the rotating body 2 rotates, they prevents the waterproof seal 46 not received on the upper surface of the rotating body 28 from abutting against the brush, moving toward the downstream side, and excluding the waterproof seal 46 not received and moving toward downstream. Also, in this example, the first brush 31 and the second brush 32 are comparable to the exclusion means of this invention.

The first sensor 33 and the second sensor 34 comprises the light sensor with the emitting portion and the light intercepting portion, wherein in order for the respective emitting portion and the light intercepting portion to face either other having the rotating body 28 in between, the installation stay 41 is fixed on the base 26. Also, the first sensor 33 and the second sensor 34 are provided on axial lines almost identical to each other extending toward the radial direction of the rotating body 28. The first sensor 33 detects the positioning bore 39 of the rotating body 28, and the second sensor 34 detects the receiving recesses 27. Signals from the respective sensor 33, 34 are transmitted to the controlling means (not shown in the figures).

The controlling means determines whether the waterproof seal 46 is received in the receiving recess 27 based on the result of detection by the first sensor 33 and the second sensor 34 and records the result in the memory provided in the controlling means per receiving recess. This controlling means, based on the content of the record in the memory, controls the starting and stopping of the motor 30 and switching of the valve sending the compressed air to the take-out device 35, thereby controlling to take out the waterproof seal 46 received in the receiving recess 27.

Also, there is an opening at the upper surface of the base portion 25 and the portion comparable to the sensing path of the first sensor 33 and the second sensor 34 respectively, thereby preventing any failure of the first sensor 33 and the second sensor 34. Here, the first sensor 33 and the second sensor 34 of this example is comparable to the receiving detection means in this invention.

The take-out device, as shown in FIG. 2(1), is provided at its left side of the rotating body 28 extending toward the outside of the base 26 and the outline is thin cylindrical figure. Furthermore, the front end side of the take-out device 35 (right side in the figure) has the installation portion 43 having the take out exit 42 (referring to FIG. 6) opening at the inner circumferential surface of the cover 29, and the take-out device 35 is installed on the base 26 via the installation portion 43. On the other hand, the rear end side of the take-out device 35 has the supply tube 44 which extends toward the installation mechanism 7. Also, as shown in FIG. 3, the take-out device 35 has an air tube 45 around the central region. A valve (not shown in the figures) is attached to one end of this air tube 45, which allows the compressed air to be sent to the air tube 45 due to the opening and closing operation of the valve.

The take-out device 35 takes out the waterproof seal 46 from the receiving recesses 27 by generating the negative pressure to cause sucking, and the inside of the take-out device has a large path communicating the path from the installation portion 43 with the path from the supply tube 44 so as to allow the waterproof seal 46 to go though. Also, the path from the air tube 45 is bent in the right angle within the take-out device 35 so as to be connected with the path from the supply tube 44. Therefore, the compressed air sent from the air tube 45 is sent into the supply tube 44, and the stream of the compressed air made the path side of the installation portion 43 negative pressure. Then, the inside of the installation portion 43 shows negative pressure, and the suction force is generated at the take-out exit 42 to suck the waterproof seal 46 positioned on the front surface of the take-out exit 42 into the take-out exit 42 with the suction force. Sucked waterproof seal 46 is sent through inside of the take-out device 35 to the supply tube 44, and the waterproof seal 46 together with the stream of the compressed air is supplied to the installation mechanism 7.

Figure 4:
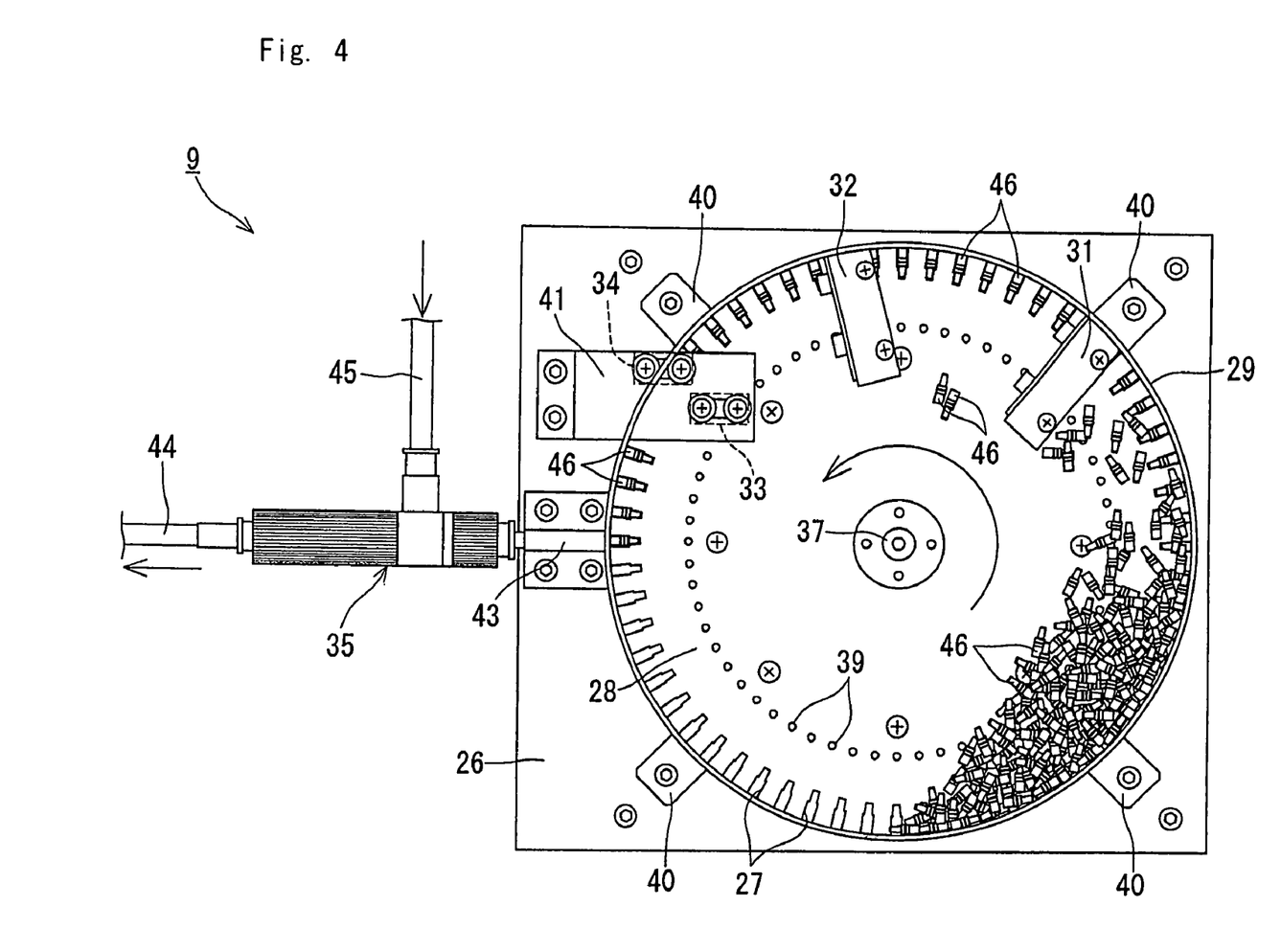
FIG. 4 is a view from an arrow A of FIG. 2(2) explaining the structure of the parts feeder.
Figure 6:
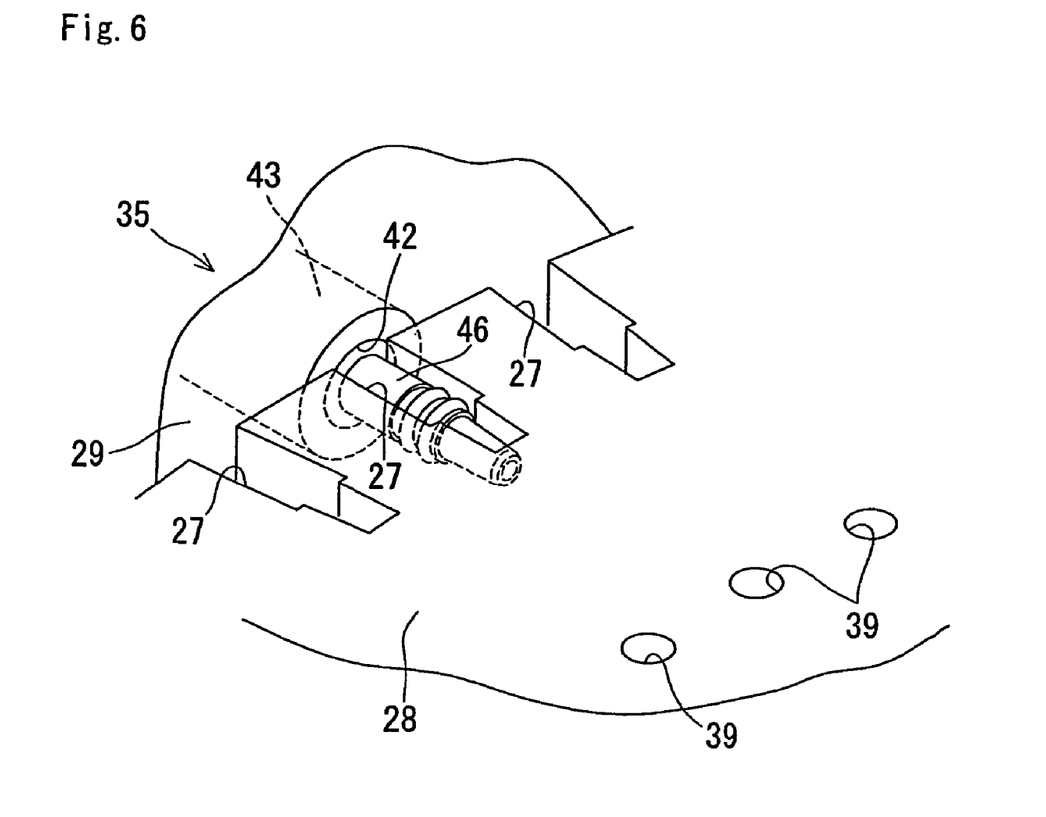
FIG. 6 is an enlarged perspective view of the principal part around the take-out exit of the take-out device.

Operation of the parts feeder 9 of this example will be explained next with reference to FIGS. 4-6. FIG. 4 is a view explaining the structure of the parts feeder viewing in the direction of arrow A of FIG. 2(2). FIG. 5 is a view explaining the relation between the receiving recess and the positioning bore and the detection means. Also, FIG. 6 is a perspective view showing the enlarged significant portion adjacent to the take-out exit of the take-out device.

The waterproof seal is supplied from the upper opening of the cover 29 to the upper surface of the rotating body 28. Then, the rotating body 28 rotates counterclockwise in the figure by the motor 30. The rotational motion of the rotating body 28 rolls the waterproof seal 46 and the centrifugal force of the rotational motion of the rotating body 28 moves the waterproof seal 46 toward the peripheral side of the rotating body 28. Also, the rotating body 28 is inclined and therefore the waterproof seal 46 is move toward the lower side of the rotating body 28. Periphery of he rotating body 29 has the cover 29 and because of the cover 29, the waterproof body 28 does not go outside of the periphery of the rotating body 28 and by the rotating motion of the rotating body 28 and the inclination of the rotating body 28, as shown in FIG. 4, the waterproof seal 46 is moved to the lower right side from the center of the rotating body 28. This region/area of the movement of the waterproof seal 46 toward the lower right side is comparable to the receiving region of this invention.

In this receiving region, plural waterproof seals 46 rolls randomly, which the waterproof seal 46 are received by the receiving recesses 27 when the direction of the waterproof seal 46 matches with the receiving direction of the receiving recesses 27 formed at the rotating body 28. Then, the receiving recesses 27 receiving the waterproof seals 46, as the rotation of the rotating body 28, moves from the receiving region to the downstream side of the rotational direction. Here, the waterproof seals 46 remaining on the upper surface of the rotating body 28 without being received by the receiving recesses 27 also moves toward the downstream side of the rotational direction as the rotation of the rotating body 28; however, the first brush 31 at the downstream side of the receiving region prevents the movement toward the downstream side and exclude the waterproof seal 46 without being received toward upstream side.

In this example, there is the second brush at the downstream side of the first brush 31. Operation of the second brush 32 is identical to that of the first brush. Besides, the second brush 32, after supplying the waterproof seals on the rotating body 28 in the case that the waterproof seal 46 is mounted on the upper surface of the rotating body 28 of the downstream side of the first brush 31, the waterproof seal 46 is prevented from moving toward the taking-out device 35.

The waterproof seals 46 received by the receiving recesses 27, as the rotation of the rotating body 28, as shown in FIG. 5, are moved to a position where the first sensor 33 and the second sensor, constituting the receiving detection means are located. The result of these first sensor 33 and the second sensor 34 is sent to the controlling means and the controlling means determines whether the waterproof seal 46 is received by the receiving recesses 27 based on the result of detection. A method of the determination will be explained in detail here. Here, the sensor is explained in terms of "ON" when the light intercepting portion receives the light from the emitting portion and "OFF" when no light interception takes place.

As the positioning bore 39 is positioned at the first sensor 33, the first sensor 33 is turned on. Then, the controlling means, when the first sensor 33 is on, recognizes that the receiving recesses 27 is positioned on the detection position and sees the detecting condition of the second sensor 34. At that time, if the waterproof seals 46 are received by the receiving recesses 27, the second sensor 34 will be turned off. That is, when the waterproof seal 46 is being received by the receiving recesses 27, the first sensor 33 is on and the second sensor is off. The controlling means determines that the receiving recesses are receiving the waterproof seals 46. On the other hand, if the receiving recesses 27 do not receive the waterproof seals 46, the second sensor is turned on. Here, the controlling means, when turns the first sensor on and the second sensor on, recognizes that the receiving recesses 27 are not in the receiving recesses 27.

When the first sensor is off, that is, when the first sensor 33 does not detect the positioning bore 39, the receiving recesses 27 is not located on the position where the sensor is provided, and therefore regardless of the detection signals from the second sensor, the controlling means determines that the receiving recesses 27 are not located at the detection position. Then, the controlling means, based on the result of detection by the first sensor 33 and the second sensor 34, records, at every receiving recess 27, whether the waterproof seals 46 are received by the respective receiving recesses 27 via memory portion.

When the waterproof seals 46 received by the receiving recesses 27, as the rotation of the rotating body 28, as shown in FIG. 6, is positioned at the front surface of the opening end of the take-out exit 42 of the take-out device 35, the controlling means stops the rotation of the motor 30 and opens the valve introducing the compressed air to the take-out device 35, thereby generating the negative pressure at the take-out exit 42. Then, the waterproof seal 46 within the receiving recess 27 is sucked and passes though the inside of the take-out device 35 to be transferred to the insertion mechanism of the ext step. Here, the controlling means, based on the information recorded in the memory regarding whether the waterproof seal 46 is received by the receiving recess 27, stops the motor 30 and controls not to activate the take-out device 35 relative to the receiving recess 27 without the waterproof seal 46.

As such, as to the above-described parts feeder 9, the receiving recess 27 receiving the waterproof seal 46 only in the predetermined direction is formed at the rotating body 28 receiving the waterproof seal 46 with the directionality, and the take-out device 35 takes out the waterproof seal 46 received by the receiving recess 27. Accordingly, the waterproof seal 46 is never received in the direction other than the predetermined direction, and the waterproof seal 46 can be directed in the predetermined direction simply by taking out the waterproof seal 46 received by the receiving recess 27, thereby providing a simple structure for the parts feeder 9.

Also, if the type of the waterproof seal 46 is changed, simply the rotating body 28 with the receiving recess 27 formed thereon with compatible shape with the waterproof seal 46 needs to be used. This can be done with simple operation and easily be employed to various waterproof seal 46, which gives the widely applicable parts feeder 9.

Furthermore, when the rotating body 28 receives plural types of the waterproof seals, the receiving recess 27 can be matched with the smallest waterproof to take out the smallest waterproof seal among the mixed waterproof seals. As such, for example, by combining the plural parts feeders 9 with different receiving recesses 27, various types of waterproof seal simultaneously became applicable.

Also, this example has the first brush 31 and the second brush 32 which remove the waterproof seal 46 not received by the receiving recess 27, and if the waterproof seal 46 not received by the receiving recess 27 mounted on the waterproof seal 46 received by the receiving recess 27 needs to be removed, prevent this condition from being obstacle and eliminate the chance of mistakenly removing the waterproof seal 46 not received.

Also, the rotation of the rotating body 28 moves the receiving recess 27, thereby simplifying the structure of the device and reducing the number of parts and costs. Also, the receiving recess 27 is formed around the periphery of the rotating body 28, and the waterproof seal 46 not received by the receiving recess 27 can be closer to the periphery of the rotating body 28 with the receiving recess 27 formed by the centrifugal force, thereby facilitating the receipt of the waterproof seal 46 relative to empty receiving recess 27

As above, preferred embodiments of this invention were explained but the embodiments of this invention are not limited to the above and as described below various improvements and modification may be possible without departing from the scope of this invention.

That is, the embodiments describe that as the moving means, the receiving part may be used as a disc-like rotating body 28 and the receiving recess 27 can be moved by the rotation of the rotating body 28. However, this invention is not limited to this type. For example, the rotating body may be a cylindrical drum and the receiving recess may be formed on the peripheral surface of the drum. The receiving recess may be moved as the rotation of the drum. The receiving portion may be end-less annular belt which may be wound around a pair of pulley or drums and the receiving recess may be formed on the belt surface to drive the belt to move the receiving recess.

In this embodiment, the rotating body 28 is installed on the rotational axle 37 of the direct motor 30 to rotate; however, this invention is not limited to this type and for example the pulley may be provided at the rotating axle where the belt is wound around among the pulley to transmit the rotational force of the motor to the rotating body via the belt. Also, toothed wheel/gear may be used instead of the pulley. As described above, by making the rotation by way of the belt or toothed wheel, the rotational speed of the rotating body may easily be increased or decreased relative to the rotational speed of the motor.

Furthermore, in this embodiment, at the insertion mechanism 7 of the terminal press-connection device 1, the waterproof seal 46 supplied from the parts feeder 9 once is changed its direction by the setting back mechanism and then is picked up by the carry pin to catch the waterproof seal by pawl member 20 from the carry pin. However, this invention is not limited to this structure, and the waterproof seal 46 supplied from the parts feeder may directly be transferred to the carry pin or pawl member. In this case, the setting back mechanism or setting back mechanism with carry pin may be omitted, thereby reducing the cost of manufacturing the terminal press-connection device.

This embodiment showed the waterproof seal as an example of taking out in the predetermined direction by the parts feeder but the waterproof seal is not limited to this embodiment. The parts feeder may be applicable if with the directionality. Also, this embodiment showed the terminal press-connection device with the parts feeder but the parts feeder of this invention may be used for a device other than the terminal press-connection device.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A parts feeder comprising:
   a receiving portion with directionality for receiving a waterproof seal which is a disc-like rotating body with inclination in a predetermined angle;
   a receiving recesses radially provided at the periphery of said receiving portion to be released in an outside of an axial right angle of the receiving portion and an upper surface, said receiving recesses receive said waterproof seals with top thereof directing a center of said receiving portion;
   a cover for restricting a movement of the receiving portion of the waterproof seal received by the receiving recess toward the outside of the axial right angle and surrounding the periphery of the receiving portion,
   a take-out means with a take-out exit opening at an inner circumferential surface of the cover to take out said waterproof seal received in said receiving recess in the axial right direction,
   a moving means for moving the receiving recess from a receiving region where the waterproof seal is received by the receiving recess to the take-out means by way of a rotational motion of the receiving portion,
   an exclusion means for eliminating a chance of moving the waterproof seal which is not received by the receiving recess and is among the waterproof seals from the receiving region to the take-out means,
   a first sensor for detecting a positioning bore standing corresponding to the receiving recess,
   a second sensor for detecting a slit formed in the receiving recess, and
   a controlling means for controlling starting and stopping of said moving means and switching of a valve sending compressed air to said take out means as determining that the waterproof seal is received by the receiving recess when a result of said first sensor detects the positioning bore and the second sensor does not detect the slit.

2. The parts feeder according to claim 1, wherein
   said moving means has a stepping motor; and
   said controlling means, when taking out the waterproof seal by the taking out means, controls the stepping motor to stop the movement of the receiving portion.

3. The terminal press-connection device comprising the parts feeder according to claim 1, wherein
   said waterproof seal supplied from the parts feeder is inserted in an end of an electrical transmission cable; and a connecting terminal is attached to perform press-connection.

* * * * *